US010348099B2

(12) United States Patent
Taylor et al.

(10) Patent No.: US 10,348,099 B2
(45) Date of Patent: *Jul. 9, 2019

(54) WIRELESS POWER COMMUNICATION

(71) Applicant: Philips IP Ventures B.V., Eindhoven (NL)

(72) Inventors: Joshua B. Taylor, Rockford, MI (US); Colin J. Moore, Grand Rapids, MI (US); Robert D. Gruich, Copley, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 51 days.

This patent is subject to a terminal disclaimer.

(21) Appl. No.: 15/648,038

(22) Filed: Jul. 12, 2017

(65) Prior Publication Data
US 2017/0310119 A1    Oct. 26, 2017

Related U.S. Application Data

(63) Continuation of application No. 14/056,294, filed on Oct. 17, 2013, now Pat. No. 9,735,584.

(51) Int. Cl.
*H02J 5/00*    (2016.01)
*H02J 7/02*    (2016.01)
(Continued)

(52) U.S. Cl.
CPC .............. *H02J 5/005* (2013.01); *H01F 38/14* (2013.01); *H02J 7/025* (2013.01); *H02J 50/12* (2016.02);
(Continued)

(58) Field of Classification Search
CPC . H01F 38/14; H02J 50/80; H02J 50/12; H02J 5/005; H04L 25/4902; H04B 5/0037
See application file for complete search history.

(56) References Cited

U.S. PATENT DOCUMENTS

| 4,802,080 A | 1/1989 | Bossi et al. |
| 5,565,846 A | 10/1996 | Geiszler et al. |

(Continued)

FOREIGN PATENT DOCUMENTS

| JP | H08-340650 | 12/1996 |
| JP | 2000-270501 | 9/2000 |

(Continued)

OTHER PUBLICATIONS

International Search Report and Written Opinion of the International Searching Authority for International Application No. PCT/US14/60828 dated Feb. 12, 2015.

*Primary Examiner* — Jared Fureman
*Assistant Examiner* — Duc M Pham
(74) *Attorney, Agent, or Firm* — Larry Liberchuk

(57) ABSTRACT

A remote device in accordance with the present invention includes an adaptive power receiver that receives wireless power from the wireless power supply by induction. The adaptive power receiver may be switched among two or more modes of operation, including, for example, a high-Q mode and a low-Q mode. By controlling the duty cycle of the switching between modes, the amount of energy received by the adaptive receiver may be controlled to communicate to the wireless power supply. This control is a form of adaptive resonance communication or Q control communication. Distortion can be reduced or eliminated by ramping between duty cycles with adjustment to intermediate duty cycle values.

30 Claims, 10 Drawing Sheets

(51) Int. Cl.
  *H04B 5/00* (2006.01)
  *H01F 38/14* (2006.01)
  *H02J 50/12* (2016.01)
  *H02J 50/50* (2016.01)
  *H02J 50/60* (2016.01)
  *H02J 50/80* (2016.01)
  *H04L 25/02* (2006.01)
  *H04L 25/49* (2006.01)

(52) U.S. Cl.
  CPC .............. *H02J 50/50* (2016.02); *H02J 50/60* (2016.02); *H02J 50/80* (2016.02); *H04B 5/0037* (2013.01); *H04L 25/4902* (2013.01); *H04L 25/0266* (2013.01)

(56) References Cited

U.S. PATENT DOCUMENTS

| | | | |
|---|---|---|---|
| 7,212,414 B2 | 5/2007 | Baarman | |
| 7,522,878 B2 | 4/2009 | Baarman | |
| 8,378,524 B2 | 2/2013 | Mita | |
| 8,452,139 B1 | 5/2013 | Matsko et al. | |
| 9,343,908 B2 | 5/2016 | Shichino | |
| 9,356,659 B2 | 5/2016 | Partovi | |
| 9,407,332 B2 | 8/2016 | Norconk | |
| 9,479,226 B2 | 10/2016 | Kwon | |
| 9,531,197 B2 | 12/2016 | Jung | |
| 9,735,584 B2 * | 8/2017 | Taylor | H02J 50/12 |
| 9,774,373 B2 | 9/2017 | Kwon | |
| 10,063,099 B2 | 8/2018 | Yeo | |
| 2007/0106217 A1 | 5/2007 | DeLegge et al. | |
| 2009/0015075 A1 | 1/2009 | Cook et al. | |
| 2009/0174263 A1 | 7/2009 | Baarman et al. | |
| 2010/0320962 A1 | 12/2010 | Sekita et al. | |
| 2011/0133569 A1 | 6/2011 | Cheon et al. | |
| 2011/0241436 A1 | 10/2011 | Furukawa | |
| 2011/0304216 A1 | 12/2011 | Baarman | |
| 2013/0249479 A1 | 9/2013 | Partovi | |
| 2015/0207333 A1 | 7/2015 | Baarman et al. | |

FOREIGN PATENT DOCUMENTS

| | | |
|---|---|---|
| JP | 2010-051137 | 3/2010 |
| WO | 89/10030 | 10/1989 |
| WO | 2014/042681 | 3/2013 |
| WO | 2013/112526 | 8/2013 |

* cited by examiner

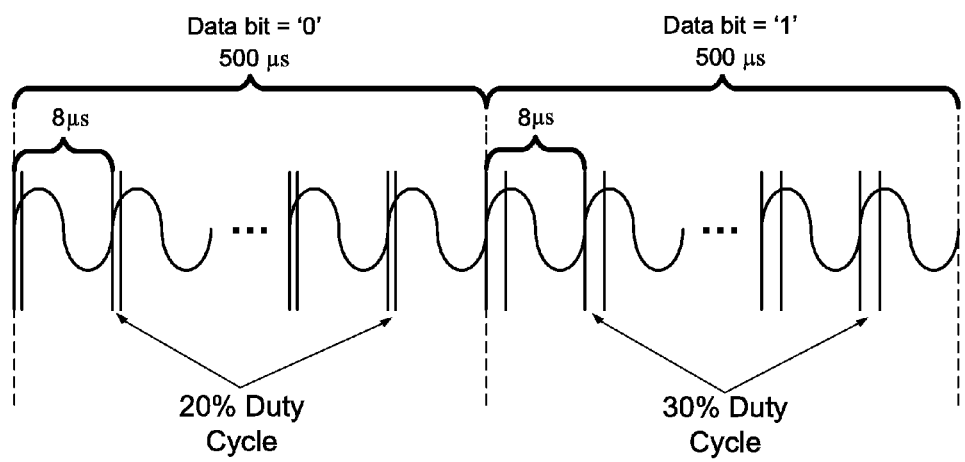
Fig. 4
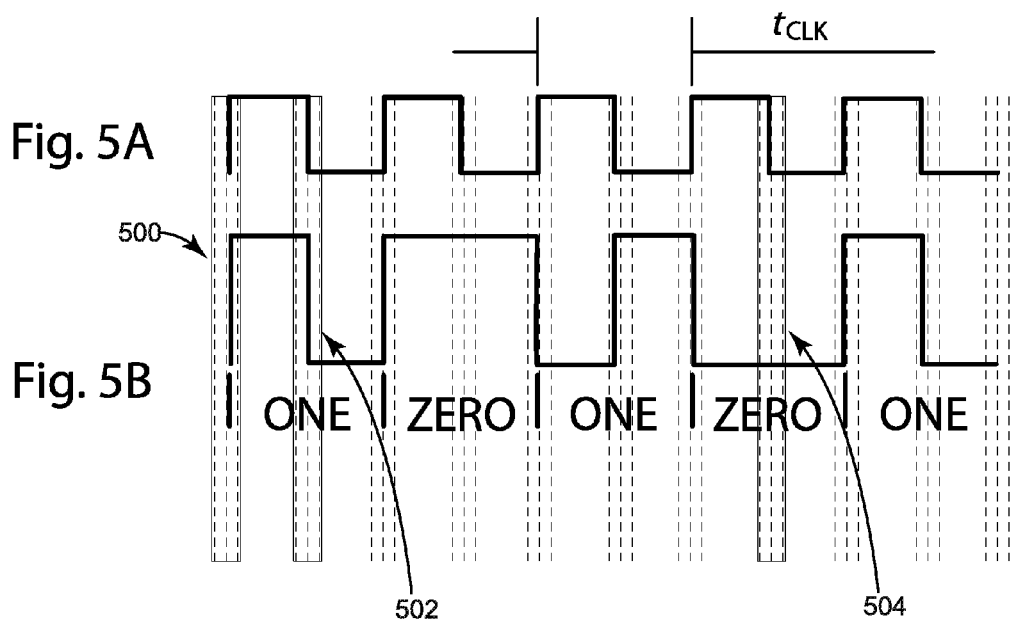

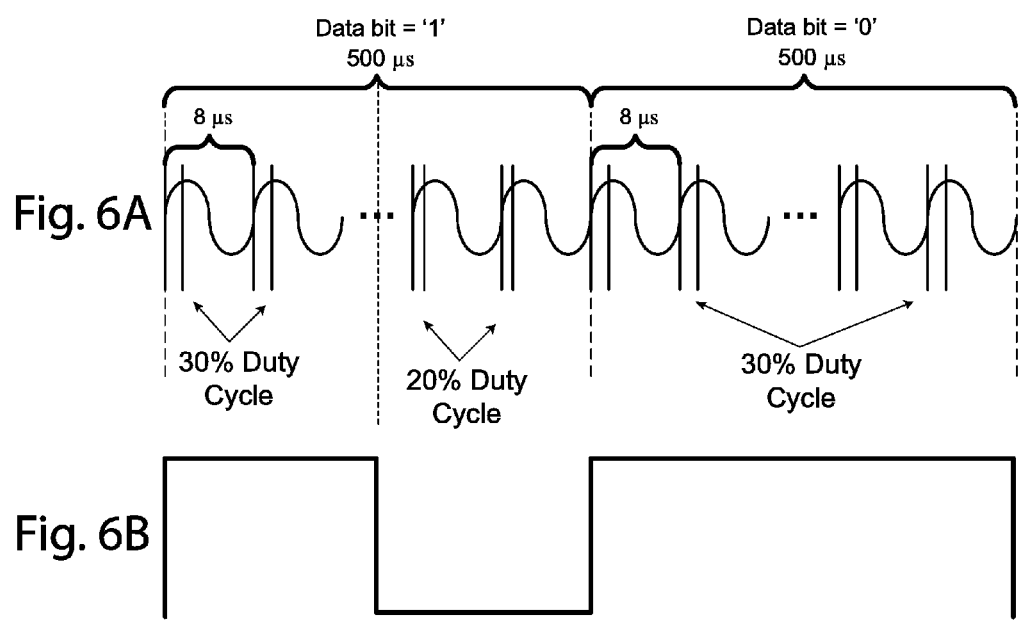

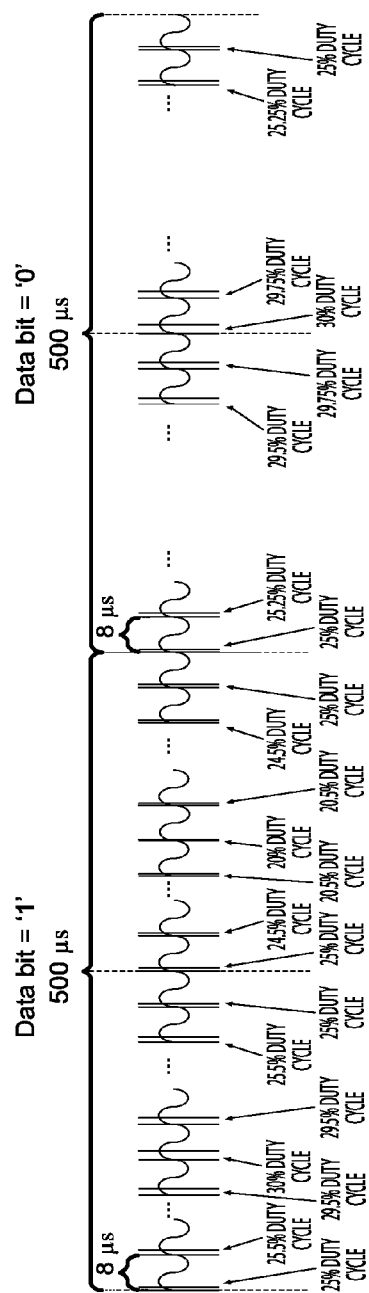
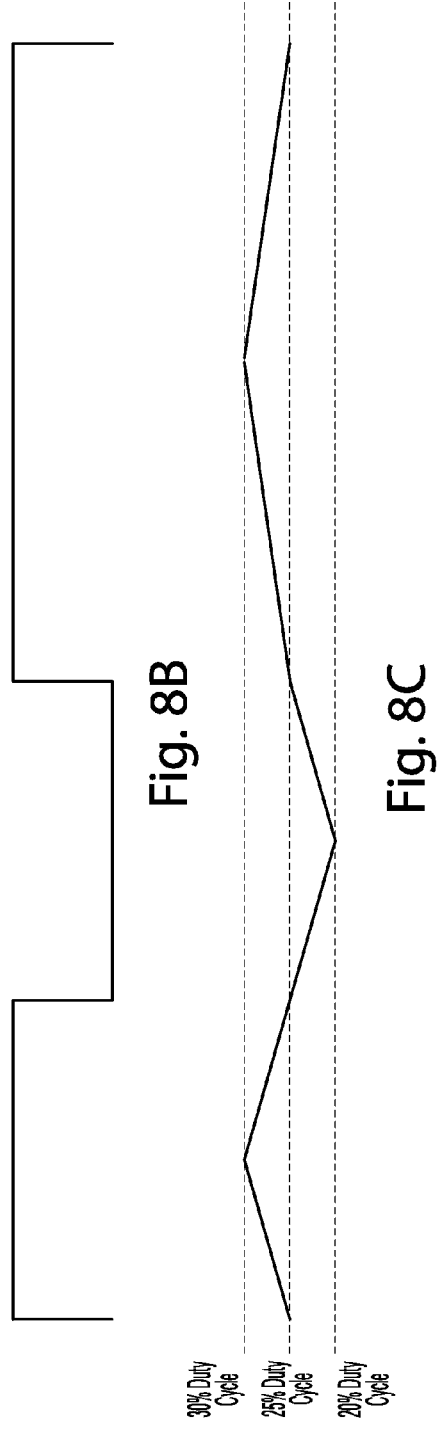
Fig. 8A
Fig. 8B
Fig. 8C

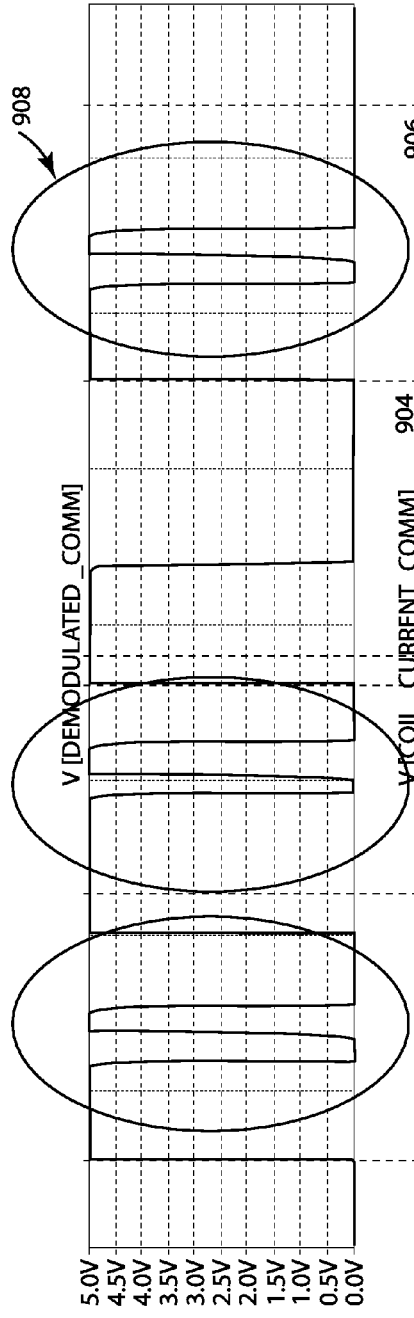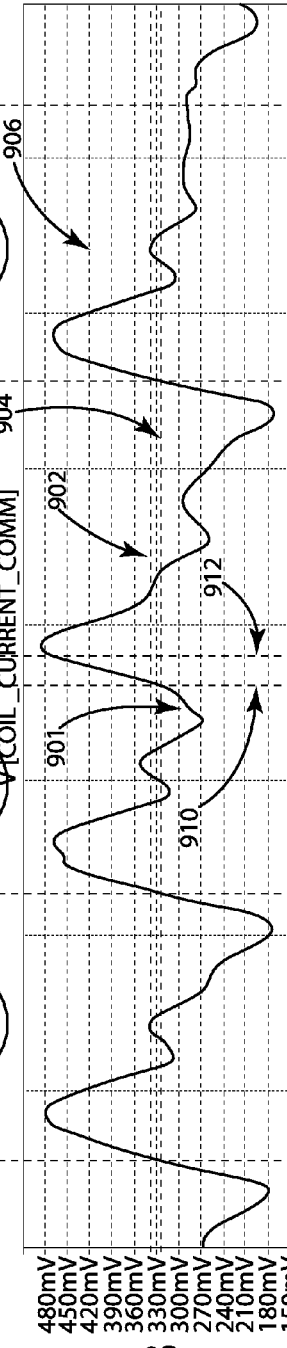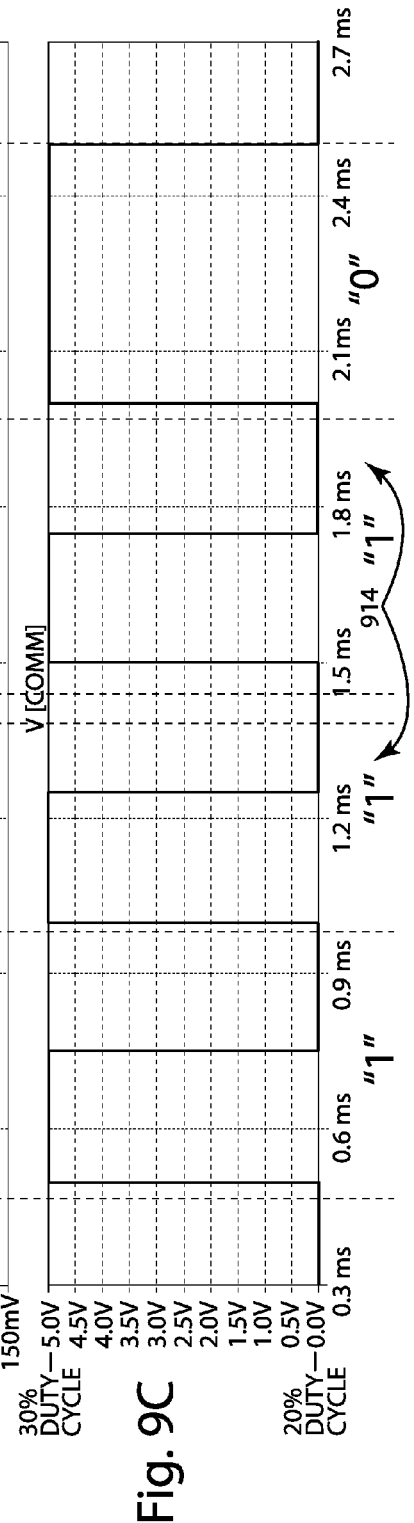

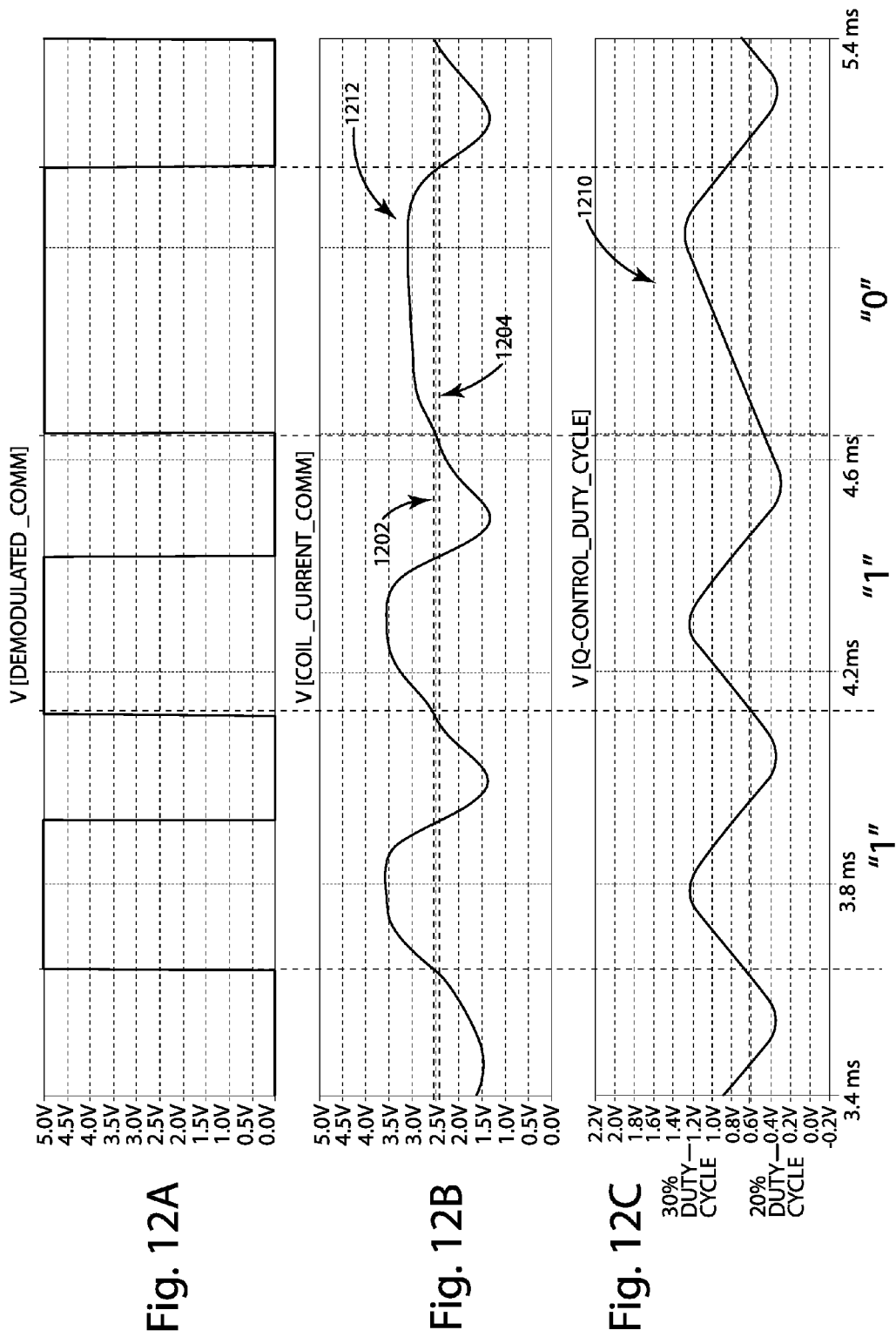

WIRELESS POWER COMMUNICATION

BACKGROUND OF THE INVENTION

The present invention relates to wireless power transfer.

Wireless power supply systems allow power to be transferred to an electronic device, such as a portable device, without the need for direct electrical connections. Wireless power transfer may be achieved using inductors, which produce magnetic fields when current flows through them. Conversely, current may be induced in an inductor when in the presence of a magnetic field, such as the magnetic field produced by another inductor. If two inductors are placed in proximity and one inductor is driven with a current, then the other inductor will produce a current even though the two inductors are not directly connected. This interrelationship between the two inductors is generally called inductive coupling, and many have used this phenomenon to transfer power without electrical connections.

In fact, many of the fundamental principles of wireless power transfer have been known for 100 years or more. Nicola Tesla, who is widely regarded as the father of wireless power transfer, is reputed to have demonstrated a system for wirelessly powering a light bulb as early as 1893. Tesla spent many years conducting research and development in the field, and amassed a significant portfolio of patents relating to wireless power transfer. As we see a resurgence of interest in wireless power, some of his early inventions are being used by those developing wireless power systems today. For example, U.S. Pat. Nos. 649,621 and 685,012 to Tesla disclose that inductive power transfer between a primary coil and a secondary coil may be improved by incorporating an additional set of intermediate coils that function as "resonating" coils to magnify the oscillations and communicate power between a primary unit and a secondary unit. More specifically, the primary unit includes a pair of coils that work together to transmit power to the secondary unit and the secondary unit includes a pair of coils that work together to receive the power. The primary unit includes a primary coil that is electrically connected to and directly receives power from the power source, as well as a resonating coil that is coupled inductively to the directly-powered coil. The resonating coil receives power inductively from the primary coil, magnifies the oscillations, and generates an electromagnetic field to communicate the power to the secondary unit. Tesla also demonstrated that capacitance used in combination with the resonating coil may produce even larger oscillations than the resonating coil by itself. The secondary unit includes another resonating coil that receives the electromagnetic field generated by the primary unit resonating coil and a secondary coil that is inductively coupled to the secondary resonating coil to directly transmit power to the secondary load. So, as can be seen, the concept of using a separate set of intermediate coils to provide an inductive coupling with improved performance has been known for over a century.

Although the basic concepts of wireless power transfer have been around for many years, there has been a relatively recent resurgence in interest in the technology, and widespread efforts are being made to implement practical and efficient wireless power transfer systems. There are a variety of factors that complicate development of efficient systems. For example, operating characteristics (i.e., conditions under which the system is operating) can have a significant impact on the quality and efficiency of the power transfer. Mutual inductance can also have an impact on the efficiency of the power transfer between the primary unit and the secondary unit. Mutual inductance depends on a number of circuit parameters, including the distance between the primary unit and the secondary unit. As the distance between the primary unit and the secondary unit is minimized, the mutual inductance increases. This inverse relationship between the distance and the mutual inductance may impose restrictions on the operating parameters of the system.

Past designs, including Tesla's four coil constructions, utilizing resonant coils driven by an inductive coil have been used for transferring power over larger distances. This type of configuration has been referred to by various names, such as highly resonant or magnetic resonance. This system may gain some efficiency due to the utilization of additional coils in order to maintain an uncoupled resonant condition that is not dampened by the load, but may lose efficiency when coupling is tightened or the coils become physically closer.

Conventional solutions have also been designed to use additional coils for inductive coupling to induce the magnetic field in either highly resonant configurations or tightly coupled configurations. But when additional coils are used in these configurations, cost may increase due to the added wire, and size may increase proportional to the added material. Efficiency may also be lower due to the added equivalent series resistance (ESR) of the additional coils.

SUMMARY OF THE INVENTION

The present invention provides a remote device having an adaptive power receiver for wirelessly receiving power that can be used to communicate with the wireless power transmitter. The adaptive power receiver is energized by a wireless power transmitter or supply for a portion of a power receiving cycle and discharged for a portion of the power receiving cycle. In one embodiment, the adaptive power receiver is electrically decoupled from the load during the energizing portion of the cycle to function as a high-Q resonating circuit that may be more readily energized. The adaptive power receiver may be electrically coupled to the load during the discharge portion to provide a direct electrical path for transferring electrical power from the energized adaptive power receiver to the load. By varying the discharge and energize duration of the power receiving cycle, referred to generally as Q-control, the amount of power received by the remote device and supplied to the load can be varied.

The remote device can selectively adjust the Q-control duty cycle between two different Q-control duty cycles to shift the impedance of the remote device and communicate to the wireless power transmitter. In some embodiments, the selective adjustment of Q-control duty cycle can include adjusting to one or more intermediate Q-control duty cycle values in-between the two different discrete Q-control duty cycles.

The remote device includes a controller capable of varying the duration of the energize and discharge portions of the power receiving cycle to control the amount of power supplied to the load. For example, the controller may increase the duration of the energize portion and decrease the duration of the discharge portion to increase power supplied to the load. The Q-control duty cycle can be expressed in terms of the percentage of time that power is supplied to the load, i.e. the discharge portion of the power receiving cycle when the Q-Control FETs are open, or in terms of the percentage of time that power is decoupled from the load, i.e. the energize portion of the power receiving cycle when the Q-Control FETs are closed.

In one embodiment, the adaptive power receiver may use Q-control to communicate to the wireless power supply. The shift in impedance caused by the Q-control will result in a change in the reflected impedance. The change in reflected impedance can be sensed by a change of amplitude of the current or voltage in the wireless power supply. Accordingly, by modulating the power signal with Q-control to change the reflected impedance, the receiver of the wireless power can effectively communicate with the wireless power supply, referred to generally as backscatter modulation.

It is possible to use backscatter modulation to encode data using the impedance shifts. Essentially any backscatter modulation encoding scheme can be implemented using Q-control. For example, bi-phase encoding can be accomplished by switching between 20% duty cycle and 30% duty cycle during a bit time to indicate a "one" and remaining at a constant duty cycle during a bit time to indicate a "zero".

Switching between discrete duty cycle values in order to create communication can introduce issues such as ringing that can distort communication. The distortion can be reduced or eliminated by ramping between the duty cycle values. For example, instead of adjusting the duty cycle directly from 20% to 30%, the duty cycle may be adjusted through a series of steps over a ramping time period to values in between 20% and 30%, which can reduce or eliminate distortion in the communication. The remote device's communication scheme may or may not include a period of time where the duty cycle is held constant after a ramping period.

The number and size of the steps of the ramping can vary depending on the configuration. For example, the remote device may increase/decrease the duty cycle by 1% 10 times in order to ramp between 20% and 30%. The size of the steps may be linear, quadratic, logarithmic, or any other function to help form the overall shape of the communication signal.

The duration of the ramping can vary. For example, the time period for ramping during a bit time may depend on the number of transitions within the bit time. In addition, the time period for ramping to the first duty cycle may differ from the time period for ramping to the second duty cycle. For example, the time period for ramping can be selected to speed up or delay reaching a certain duty cycle value, thereby determining whether the duty cycle is achieved near the beginning, middle, or the end of the bit time. Delayed peak duty cycle transitions can reduce quick zero bit decays.

In one embodiment, two duty cycle values can be switched between by ramping to a first duty cycle value by repeatedly adjusting the duty cycle to intermediate duty cycle values closer to the first duty cycle value, maintaining that first duty cycle value for a period of time, and ramping to a second duty cycle value by repeatedly adjusting the duty cycle to intermediate duty cycle values closer to the second duty cycle value. This process can be repeated systematically to form bits of data. For example, a bi-phase bit encoding scheme uses a transition at the beginning and end of each bit time. If a transition occurs within the bit time, the bit time is defined as a "one"; if no transition occurs within the bit time, the bit time is defined as a "zero".

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 4 shows a graph of two bits in one embodiment of a Q-control communication signal FIG. 5A shows a graph of a clock signal waveform.

FIG. 5B shows a graph of a bi-phase encoded communication signal waveform.

FIG. 6A shows a graph of Q-control duty cycle adjustments overlaid on a wireless power signal waveform received by a remote device.

FIG. 6B shows a graph of a bi-phase encoded communication signal.

FIG. 8A shows a graph of Q-control adjustments with ramping overlaid on a wireless power signal received by a remote device.

FIG. 8B shows a bi-phase encoded communication signal generated by the wireless power signal illustrated in FIG. 8A FIG. 8C shows a graph of Q-control duty cycle values used to generate ramping Q-control communication.

FIG. 9A shows a graph of a distorted communication signal waveform generated by Q-control communication.

FIG. 9B shows a graph of coil current in the wireless power transmitter during Q-control communication.

FIG. 9C shows a graph of Q-control duty cycle values used to generate Q-control communication.

FIG. 12A shows a graph of an improved communication signal generated by ramping Q-control communication with delayed peak duty cycle transition.

FIG. 12B shows a graph of coil current in the wireless power transmitter during ramping Q-control communication with delayed peak duty cycle transition.

FIG. 12C shows a graph of ramping Q-control duty cycle values with delayed peak duty cycle transition used to generate ramping Q-control communication.

DESCRIPTION OF THE CURRENT EMBODIMENTS

Figure 1:
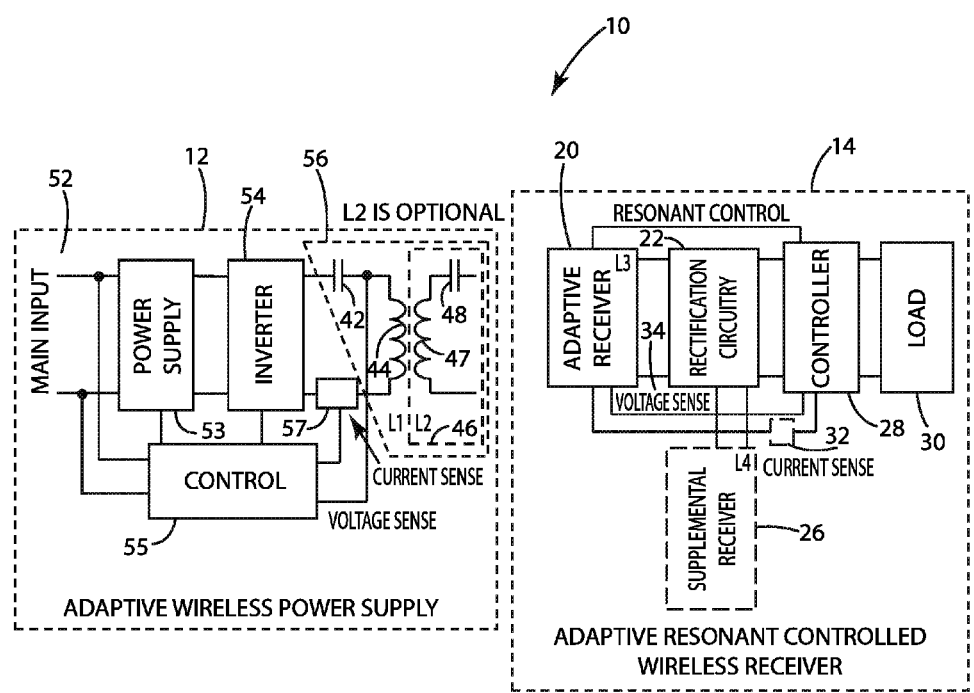
FIG. 1 shows a three or four coil inductive wireless power system.

A wireless power supply system in accordance with an embodiment of the present invention is shown in FIG. 1 and designated 10. A remote device in accordance with one embodiment of the present invention can enable flexible power transfer, for example to allow the remote device to control the amount of power it receives, which can be used to communicate and/or provide an appropriate amount of power to the load. The wireless power supply system 10 includes a remote device 14 configured to receive wireless power and a wireless power supply 12 configured to transmit power. Although described in connection with a single remote device 14, the present invention is not limited to power transfer to just one remote device 14 and is well suited for supplying power to multiple remote devices, such as by supplying power sequentially or simultaneously. One or more of the remote devices 14 in this circumstance may be conventional remote devices.

The remote device can control the amount of power it receives in order to communicate, meet its power requirements, or for essentially any other reason. Information may be communicated to the wireless power supply by the remote devices prior to or during power supply to the battery or load.

The present invention is described in connection with a wireless power supply system that implements a form of adaptive resonance control. Among other things, adaptive resonance control allows the system to adapt to a variety of potentially variable parameters, such as the power supply limitations of the wireless power supply, the number of remote devices, the power requirements of the remote devices, the presence of foreign objects (parasitic metal) and the coupling coefficients between the wireless power supply, the remote devices and/or any intermediate coils (e.g., angle, orientation and distance). For example, the wireless power supply may have the ability to control its output power by adjusting the resonant frequency of the transmitter, the rail voltage of the drive signal, the duty cycle of the drive signal, the operating frequency of the drive signal or phase of the drive signal. The wireless power supply may vary its output power to correspond with the power requirements of the remote devices or to improve the power transfer efficiency of the system. Adaptive resonance control, or Q-control, is described in International Patent Application No. PCT/US13/31137, dated Mar. 14, 2013 to Baarman et al, which is hereby incorporated by reference in its entirety.

As part of the adaptive resonance control, each remote device may also be capable of controlling the amount of power drawn from the wireless power supply. For example, each remote device may include an adaptive power receiver in accordance with an embodiment of the present invention. Each remote device may control the amount of power drawn from the wireless power supply based on information communicated to that remote device by the wireless power supply and/or the other remote devices. In addition or as an alternative to communications, the remote device may include sensors that allow it to determine operating parameters. For example, the remote device may include voltage, current and/or power sensors that allow the remote device to monitor aspects of the system and adjust its power draw. When the wireless power supply is not capable of providing sufficient power for all of the remote devices, one or more of the remote devices may reduce its power draw. For example, a remote device capable of operating on less power may reduce its power draw to leave more power for other remote devices. The wireless power supply and/or the remote devices may determine how to allocate the power among the various remote devices. As a further part of the adaptive resonance control, the wireless power supply may include adaptable intermediate coils (e.g., a resonating coil in the wireless transmitter or in a field extender) that are capable of being adjusted to control the amount of power relayed through the intermediate coils.

Separate from the ability to control the amount of power received by the remote device in connection with the adaptive resonance control, the remote device may control the amount of power received in order to create a shift in impedance, which can be sensed and demodulated in the wireless power supply as communication. This ability to communicate may be in addition to any adaptive resonance control provided by the remote device. That is, the remote device may not conduct any adaptive resonance for power control to the load and instead may use the ability to control the amount of power received solely to communicate with the wireless power supply.

The remote device 14 may include a generally conventional electronic device, such as a cell phone, a media player, a handheld radio, a camera, a flashlight or essentially any other portable electronic device. The remote device 14 may include an electrical energy storage device, such as a battery, capacitor or a super capacitor, or it may operate without an electrical energy storage device. The components associated with the principle operation of the remote device 14 (and not associated with wireless power transfer) are generally conventional and therefore will not be described in detail. Instead, the components associated with the principle operation of the remote device 14 are generally referred to as a principle load 30. For example, in the context of a cell phone, no effort is made to describe the electronic components associated with the cell phone itself, such as a battery or a display.

Figure 2:
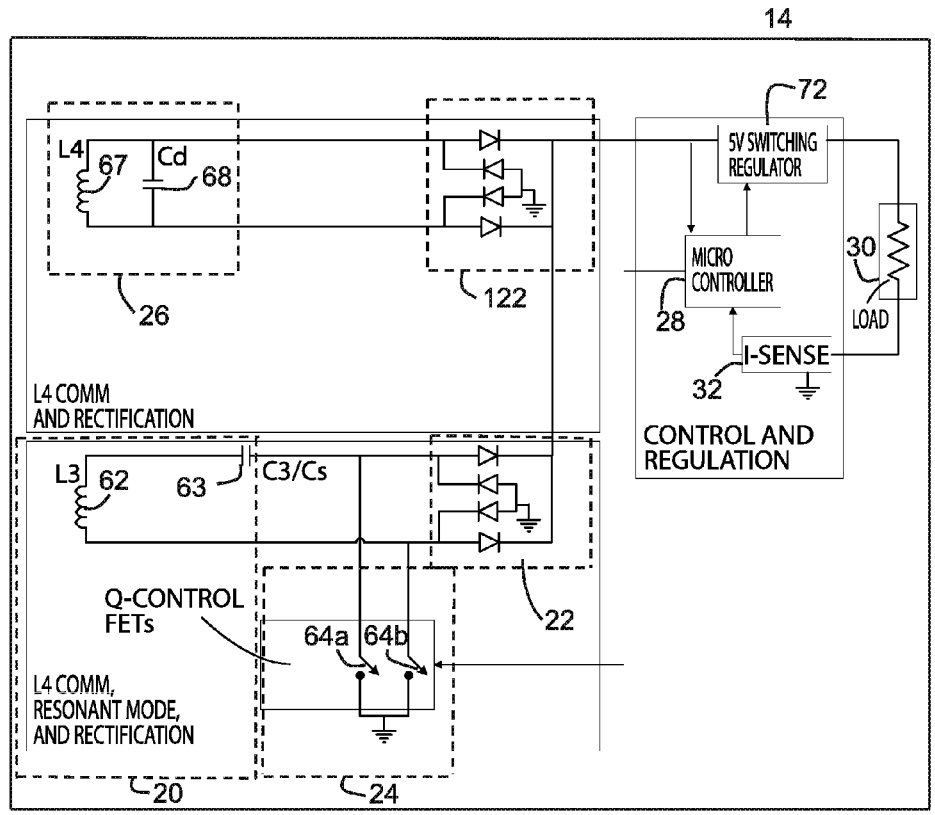
FIG. 2 shows a remote device schematic with an adaptive receiver and a supplemental receiver, where the adaptive receiver Q-control FETs can be used for communication.
Figure 3:
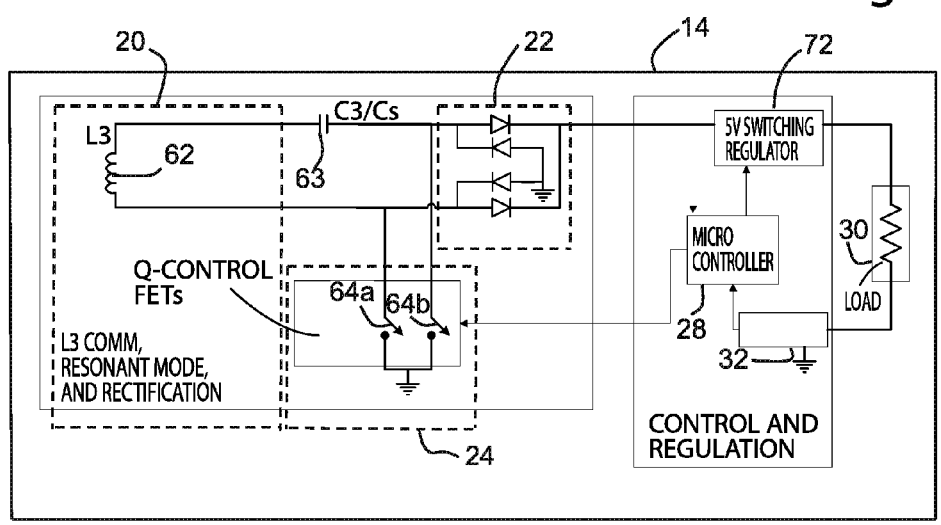
FIG. 3 shows a remote device schematic with an adaptive receiver where the adaptive receiver Q-control FETs can be used for communication.

The remote device in accordance with the illustrated embodiments of FIGS. 2 and 3 includes an adaptive power receiver 20 that receives wireless power from the wireless power supply by induction. FIG. 2 illustrates a remote device having an adaptive receiver L3 and a supplemental receiver L4. FIG. 3 illustrates a remote device having an adaptive receiver L3, without a supplemental receiver L4. The remote device 14 also includes a controller 28 capable of controlling the adaptive power receiver 20 in order to control the reception of wireless power. The controller 28 in the illustrated embodiment may switch the adaptive power receiver 20 between two or more modes of operation, including, for example, a high-Q mode and a low-Q mode. By controlling the switching between modes, the controller 28 may control the amount of energy received by the adaptive power receiver 20. This control is a form of adaptive resonance control or Q control.

The remote devices of FIGS. 2 and 3 allow modulation on L3 for both resonant and non-resonant modes of operation. Because Q-control communication is implemented in both remote devices, components for conventional communication can be removed. This can make the devices cheaper to produce. The Q-Control FETs can be driven at essentially two different rates: Micro adjustments for power/voltage control and Macro adjustments for communication modulation The optional parallel capacitor Cd 68 in FIG. 2 can be used to form a resonant frequency identification signature, and is tuned at a different resonant frequency than the power transfer. This parallel capacitor has little effect on the overall efficiency of the power transfer due to the difference in resonant frequencies.

Q factor, sometimes just referred to as Q, can describe a resonator's bandwidth relative to its center frequency. Q can be defined in terms of the ratio of the energy stored in a resonator to the energy supplied by a generator, per cycle, to keep signal amplitude constant, at a frequency where the stored energy is constant with time. The stored energy is the sum of energy stored in any inductors and capacitors and the lost energy is the sum of the energy dissipated in resistors per cycle. Resistors can be equivalent series resistances or designed load.

In a four coil wireless power supply receiver, the L4 coil is typically used to harvest the field generated when L3/C3 resonates. Because L3/C3 is electrically isolated, its high Q factor allows it to generate field at lower coupling factors, enabling the remote device to receive power at greater distances. In some circumstances, high Q can allow a current to be induced in L3 that is not dissipated by its ESR. This induced current can then regenerate, extend, focus, or continue the magnetic field.

In the depicted embodiments of the present invention, L4 can be removed from the circuit and L3/C3 can be selectively electrically decoupled from the load at certain times, and at other times electrically coupled to the load. Energy generated when L3/C3 are electrically decoupled can be harvested by electrically coupling L3/C3 to the load. Changing the rate at which L3/C3 is electrically decoupled vs. electrically coupled to the load can control the amount of power delivered to the load—this is a form of adaptive resonance control or Q-control.

The remote device 14 may also include a controller 28 capable of controlling the adaptive power receiver 20. For example, the controller 28 may couple to one or more switches of the adaptive power receiver 20 (described in further detail herein) to select whether the adaptive power receiver 20 is operating in a high-Q mode or a low-Q mode. The controller 28 may control cycling between various modes of operation in accordance with the power waveform received in the adaptive power receiver 20. For example, as will be described in further detail herein, the controller 28 may operate the adaptive power receiver 20 in a high-Q mode for one or more portions of each period of the current waveform and operate the adaptive power receiver 20 in a low-Q mode for the remainder of each period.

In the illustrated embodiment, the remote device 14 also includes rectification circuitry 22 to rectify power received in the adaptive power receiver 20—e.g., converting alternating current output from the adaptive power receiver 20 to direct current used by the remote device 14. Such circuitry may comprise diodes, switches, or any combination thereof to provide one or more modes of rectification, including for example diode rectification, semi-synchronous rectification, discontinuous mode rectification, and full-synchronous rectification. In configurations in which the rectification circuitry 22 is capable of synchronous (or active) rectification, the controller 28 or self-driven synchronous rectification circuitry may control rectification.

With the adaptive power receiver 20 being configurable between various modes, it allows the system to implement a form of adaptive resonance control or Q control. Use of adaptive resonance in one embodiment may allow for use of a highly resonant adaptive power receiver 20 (e.g., a high-Q receiver) at certain times in order to adapt to a wide variety of configurations, including variations in the load and coupling between the adaptive power receiver 20 and a transmitter 56 of the wireless power supply 12 described in detail below. This control methodology may allow for versatile control for configurations ranging from close or tightly coupled (higher k coefficient) configurations and loosely coupled (lower k coefficient) configurations. This methodology may also enable higher efficiency by storing energy in the adaptive power receiver 20 for periods of time, and then releasing the energy into the remote device 14. Accordingly, an extended range of power transfer may be achieved, as well as potential elimination of additional ESR (equivalent series resistance) within the adaptive power receiver 20. For example, using this configuration, the benefits of a two coil receiver (e.g., an electrically isolated resonant circuit and a resonant circuit connected to the load), which can receive power at a distance from a wireless power supply, can be realized with a single coil that can switch between two modes—one mode where it is configured as an electrically decoupled resonant circuit and a second mode where it is a resonant circuit electrically coupled to the load. The benefits can be enhanced when the switching between the two modes is executed within a power receiving cycle. That is, once or more per cycle of a current waveform in the adaptive power receiver.

Turning now to FIG. 3, a remote device 14 according to one embodiment of the present invention is shown. FIG. 3 shows one embodiment of a remote device with an adaptive power receiver circuit. In operation, the microprocessor may have an initialization algorithm. Sufficient field or energy from a storage element can be used to turn on the microprocessor and operate the Q-Control FETs. The Q-control FETs can be operated to make L3/C3 an electrically decoupled resonant circuit. The remote device may synchronize the duty-cycle of the Q-control FETs control signal with the current waveform. For example, the remote device may detect zero crossings of the current waveform and use them to turn on the Q-control FETs. In the event that it is desirable to maintain a consistent duty cycle as the frequency of the current waveform changes, the remote device may make adjustments based on the frequency of the current waveform. For example, the remote device may detect the frequency of the current waveform, may receive the frequency from the power transmitter, or may look it up in a table stored in memory based on other parameters. Alternatively, although the timing of the switches may be controlled digitally, it is also possible to control the Q-control FETs using analog control. For example, the remote device may include a sensor and the timing of the Q-control FETs may be adjusted based on output from the sensor. For example, the sensor may detect the rectified voltage and a voltage controlled oscillator can control a portion of the timing of the Q-control FETs by dictating when the Q-control FETs are open.

In the illustrated embodiment, the remote device 14 includes an adaptive power receiver 20 configurable between two modes: a high-Q mode and a low-Q mode. The adaptive power receiver 20 in this embodiment includes a secondary 62, a resonant capacitor 63, and one or more switches 64*a-b* arranged to form a series resonant tank circuit capable of being switched between a high-Q mode and a low-Q mode. The present invention is not limited to use with series resonant tank circuits and may instead be used with other types of resonant tank circuits and even with non-resonant tank circuits, such as a simple inductor without a matching capacitance, or parallel resonant tank circuits.

In the illustrated embodiment, the switches 64a-b may be controlled by the controller 28 to selectively configure the adaptive power receiver 20 between a high-Q mode and a low-Q mode. As shown, there are two switches 64a-b coupled to the controller 28. The switches 64a-b may be controlled separately or together by the controller 28 to configure the adaptive power receiver 20 in a high-Q mode. More specifically, the switches may be closed to complete a circuit path between the secondary 62 and the resonant capacitor 63 that bypasses the rectification circuitry 22 and the load 30 of the remote device 14—in other words, the resonant circuit formed by the secondary 62 and the resonant capacitor 63 is shunted. In this way, the secondary 62 and resonant capacitor 63 may form a high-Q resonator capable of accumulating energy and increased energy transfer (in comparison to a low-Q mode) from the transmitter 56. For purposes of disclosure, the present invention is described in connection with two switches 64a-b capable of selectively configuring the adaptive power receiver, but it should be understood that a single switch or more than two switches may be used to achieve the same or similar results. Further, in an alternative embodiment, the switches 64a-b may be used, as described in connection with rectification circuitry 22, to perform synchronous rectification.

In order to configure the adaptive power receiver 20 from a high-Q mode to a low-Q mode, the controller 28 may open the switches 64a-b based on sensed output from a sensor, such as a voltage sensor 34 or a current sensor 32, or both. The voltage sensor 34, current sensor 32, or both may be coupled to the adaptive power receiver 20 or the load 30 in order to monitor one or more characteristics of power in the remote device 14. It should be understood that although shown connected to the adaptive power receiver 20 or the load 30, the sensors may be connected to any node within the remote device 14. Further, the present invention is not limited to current or voltage sensors; one or more sensors capable of monitoring any characteristic in the remote device 14 may be incorporated so that the sensor output may be used to determine the configuration of the adaptive power receiver 20.

With the switches 64a-b open, circuitry in the remote device 14 that is bypassed in the high-Q mode (such as the rectification circuitry 22 and the load 30) becomes coupled to the adaptive power receiver 20 so that the load 30 may be powered from the adaptive power receiver 20, potentially increasing the ESR of the adaptive power receiver 20 and transitioning it to a low-Q mode. Put differently, if energy is coupled to the load 30 directly from the adaptive power receiver 20 by opening the switches 64a-b, the stored energy is discharged into the load 30 transitioning the adaptive power receiver 20 to a low-Q mode.

By cycling between a low-Q mode and a high-Q mode, the effective Q of the adaptive power receiver 20 may be controlled over time. For example, by varying the duty cycle of the switches 64a-b to switch between the two modes, the effective Q of the adaptive power receiver 20 may be increased or decreased. The high-Q mode may be maintained long enough to store sufficient energy to build enough voltage or current at a given coupling, but not so long as to build more voltage or current than needed by the load 30. This can enable wireless power transfer over a very wide coupling range without voltage regulation in the remote device 14. For example, if the remote device 14 is very loosely coupled, the duty cycle may be increased to increase the duration of the high-Q mode, allowing the adaptive power receiver 20 to store additional energy. Alternatively, in an increased coupled state, because energy may be more easily transferred to the adaptive power receiver 20 in a low-Q mode and energy may be more easily stored in the high-Q mode, the duty cycle may be reduced to lessen the duration of the high-Q mode. This reduction in duty cycle may compensate for the increased energy transfer in low-Q mode and storage in high-Q mode. By increasing or decreasing the duty cycle between the high-Q mode and the low-Q mode, the adaptive power receiver 20 may control the amount of power received, including for example control over the bridge voltage of the receiver.

In the illustrated embodiment, the adaptive power receiver 20 includes a single secondary 62 capable of being used in high-Q and low-Q modes of operation. As a result, a single coil receiver may be able to efficiently receive power over a wide range of coupling states and loads 30 without using additional coils or costly DC/DC converters for power regulation. That is, in some embodiments, the regulator 72 illustrated in FIGS. 2 and 3 may be optional and can be removed from the circuit. In one embodiment, this ability may enable the remote device 14 to control the amount of power received over a range of field levels provided by the transmitter 56 without using complex communication and control systems. In other words, the remote device 14 may simply receive as much power from the wireless power supply 12 that it desires without having to communicate a request or information to the wireless power supply 12, and without using additional power regulation circuitry.

Cycling between the high-Q and low-Q modes of operation will now be described in further detail with respect to FIG. 3. However, it should be understood that this cycling methodology may be used in conjunction with any of the other embodiments described herein.

Shunting of the secondary 62 and resonant capacitor 63 (or holding the adaptive power receiver 20 in a high-Q mode) over multiple power receiving cycles during power transfer may affect the stability of the power transfer, resulting in large variations in the rectified voltage output from the rectification circuitry 22. These variations may appear as overshoot and undershoot due to the fact that while the adaptive power receiver 20 is maintained in a high-Q mode, the induced voltage across the rectification circuitry may be greatly reduced. Additional bulk capacitance and power conditioning circuitry may be used to minimize this undershoot and overshoot so that power delivered to the load 30 is substantially stabilized. However, the present invention may achieve stability without such additional circuitry or additional bulk capacitance by cycling between the high-Q mode and the low-Q mode.

In one embodiment, switching between high-Q and low-Q modes may be performed on a cycle-by-cycle basis and according to a specified duty cycle. That is, the switching may be aligned with the cycles of the power being received in the adaptive power receiver 20 so that for each period of the power waveform, the adaptive power receiver 20 is configured in a high-Q mode for a portion of that period. By switching between modes on a cycle-by-cycle basis for a certain duty cycle, it may be possible to reduce the duration of time for which the voltage across the rectification circuitry 22 is allowed to drop. This means that the bulk capacitance on the output of the rectification circuitry 22 may be decreased, thereby reducing the overall size and cost of the remote device 14.

In the current embodiment, the method for switching to high-Q mode is performed on a cycle-by-cycle basis, where a high-Q mode transition occurs as the current in the adaptive power receiver 20 approaches zero, such as when the current switches directions within the secondary 62. These zero crossing transitions may be detected, for example, by the one or more sensors 32, 34 coupled to the controller 28. Output from one or more of these sensors 32, 34 may be fed to a comparator to detect a zero crossing of the coil current.

For purposes of disclosure the wireless power supply system 10 will now be described in connection with wireless power supply 12. It should be understood that the wireless power supply system 10 is not limited to a wireless power supply configured according to the wireless power supply 12 and that a conventional wireless power supply may be used in alternative embodiments. The wireless power supply 12 in the illustrated embodiment of FIG. 1 may be configured to control transmission of power wirelessly to one or more remote devices 14.

The wireless power supply 12 according to the illustrated embodiments of FIG. 1 may include a transmitter 56, a control system 55, a driver 54, a power supply 53, and a mains input 52. The power supply 53 of the current embodiment may be a conventional converter that transforms an AC input (e.g., wall power) from the mains input 52 into an appropriate DC output suitable for driving the transmitter 42. As an alternative, mains input 52 may be a DC source, which the power supply 53 may pass through or transform into an appropriate DC output for driving the transmitter 56. In this embodiment, the power supply 53 is an AC/DC converter generally having a rectifier and a DC/DC converter. The rectifier and DC/DC converter provide the appropriate DC output. The power supply 53 may alternatively include essentially any circuitry capable of transforming input power to a form used by the driver 54. In this embodiment, the control system 55 is configured to adjust operating parameters, including for example rail voltage, to energize the transmitter 56 for power transfer. Alternatively, the power supply 53 may have a fixed rail voltage. The control system 55 may additionally or alternatively have the ability to adjust any other operating parameter, including for example operating frequency of the drive signal, resonant frequency of the tank circuit, switching circuit phase and duty cycle of the drive signal. In an alternative embodiment where it is desirable to adjust operating parameters by varying the rail voltage of the drive signal, the power supply 53 may have a variable output. The control system 55 may be coupled to the power supply 53 to allow the control system 55 to control the output of the power supply 53.

In this embodiment, the driver 54 includes switching circuitry that is configured to generate and apply an input signal to the transmitter 56. The driver 54 may form an inverter that transforms the DC output from the power supply 53 into an AC output to drive the transmitter 56. The driver 54 may vary from application to application. For example, the driver 54 may include a plurality of switches, such as MOSFETs or other switching circuitry, such as BJTs or IGBTs, arranged in a half-bridge topology or in a full-bridge topology.

In this embodiment, the transmitter 56 includes a primary 44 and a resonant capacitor 42 to form a tank circuit arranged in a series configuration. The present invention is not limited to use with series resonant tank circuits and may instead be used with other types of resonant tank circuits and even with non-resonant tank circuits, such as a simple inductor without matching capacitance, or parallel resonant tank circuits. And, although the illustrated embodiment includes coils, the wireless power supply 10 may include alternative inductors or transmitters capable of generating a suitable electromagnetic field. The transmitter 56 in the illustrated embodiment also includes a resonator circuit 46 having a resonator coil (or inductor) 47 and a resonator capacitor 48, enabling the primary 44 to transmit power in conjunction with the resonator circuit 46. In alternative embodiments, the resonator circuit 46 may be absent so that the primary 44 transmits wireless power with the aid of a resonator circuit 46.

The wireless power supply 12 may also include a sensor 57 capable of sensing a characteristic of power in the primary 44. For example, the sensor 57 may be a current sensor that provides information to the control system 55, which may adjust operating parameters based on the sensed information. Other characteristics of power capable of being sensed include, but are not limited to, real power, apparent power, phase, and voltage.

The control system 55 includes portions configured, among other things, to operate the driver 54 to produce the desired power supply signal to the transmitter 56. For example, the control system 55 may control the driver 54 or adjust operating parameters based on communications received from the remote device 14. Alternatively or in addition to control based on communications, the control system 55 may adjust operating parameters based on a characteristic of power sensed in the sensor 57. The present invention may be implemented using essentially any systems and methods capable of transferring wireless power. Suitable wireless power transfer systems and various alternatives are described in U.S. Pat. No. 7,212,414, which is entitled ADAPTIVE INDUCTIVE POWER SUPPLY, and was issued May 1, 2007, to Baarman; and in U.S. Pat. No. 7,522,878, which is entitled ADAPTIVE INDUCTIVE POWER SUPPLY WITH COMMUNICATION, and was issued Apr. 21, 2009, to Baarman—all of which are incorporated herein by reference in their entirety.

As mentioned above, Q-control can be used to implement backscatter modulation and enable communication between a remote device and an inductive power supply. Backscatter modulation generally refers to connecting and disconnecting a circuit element to the power receiving or power transmitting element. Q-control backscatter modulation generally refers to changing the duty cycle of the Q-control FETs in order to create an impedance shift in the wireless power carrier signal that can be used to communicate. That is, the changes in impedance can be detected in the wireless power supply by a current or voltage sensor and demodulated by a controller or demodulator circuit.

Referring to FIGS. 2 and 3, the adaptive power receiver 20 may use the Q-control FETs 64*a-b* to shift the impedance and produce a communication signal. The illustrated embodiments allow backscatter modulation for both resonant and non-resonant modes of operation.

An adjustment in the duty cycle of the signal controlling the Q-control FETs 64*a-b* can cause an impedance shift. Effective communication may involve periodic adjustment of the duty cycle after a number of power receive cycles. The shift in impedance caused by the duty cycle change will result in a change in rectified impedance to the primary coil, sufficient to effectively communicate. The voltage on the secondary may shift due to the duty cycle change as well. In one embodiment, there is a minimum shift in receiver voltage while maintaining a strong shift in primary coil current, voltage, phase, or any combination thereof.

An example of such a communication methodology is show in FIG. 4 where bits or bit transitions are represented by a change in duty cycle from 20% to 30%. FIG. 4 illustrates a simple encoding scheme where zero bits are communicated by running the Q-control FETs at 20% and one bits are communicated by running the Q-control FETs at 30%.

Another encoding scheme that can be implemented with Q-control is bi-phase encoding. FIGS. 5A-5B illustrate one embodiment of bi-phase encoding. In bi-phase encoding a one bit is encoded using two transitions, the first transition coincides with the rising edge of the clock signal, and the second transition coincides with the falling edge of a clock signal. A zero bit is encoded using a single transition, which coincides with the rising edge of a clock signal.

FIG. 5A illustrates the clock signal and FIG. 5B illustrates a bi-phase encoded communication signal with the clock signal of FIG. 5A. The beginning and end of a bit-time is indicated by a transition within a window of tclk. The window at the beginning of one bit time is illustrated as 500. Tclk can be established by the preamble of the receiver communication, predefined and known by both the transmitter and the receiver, or established in another way. A one bit is detected by the presence of a transition in the center window of a bit time, for example the 502 window shows a window where a transition occurs. A zero bit is detected by the lack of a transition in the center window, i.e. the 504 window where no transition occurs. Transitions outside of the windows may be either ignored or flagged as bit errors. Extra or missing transitions due to distortion in the communication can impede communication.

FIGS. 6A-6B illustrate application of bi-phase encoding using Q-control. FIG. 6A shows the wireless power carrier signal, which represents the amount of power received by the wireless power receiver. FIG. 6B illustrates the bi-phase encoded communication signal that is to be communicated to the wireless power supply, in this case, a "one" bit and a "zero bit. Referring to both graphs, it can be seen that the duty cycle values of the q-control FETs change over time. A high value indicates 30% duty cycle, and a low value indicates a 20% duty cycle. During the first 250 microseconds, the Q-control FETs are operated at 30% duty cycle, during the next 250 microseconds, the Q-control FETs are operated at 20% duty cycle, and during the last 500 microseconds, the Q-control FETs are operated again at 30% duty cycle. The transition from 30% to 20% that occurs during the first 500 microsecond bit time indicates that the data bit for that 500 microseconds is a one. The lack of a transition to a different duty cycle during the second 500 microseconds indicates that the data bit is a 0 for that time period.

FIGS. 9A-9C show how using large discrete duty cycle jumps for Q-control modulation can cause ringing in the demodulated information and disrupt communication. This may be caused by the under-damped response of the wireless power system. An exemplary Rx communication signal encoded with 4 bits of data is illustrated in FIG. 9C. 5 volts indicates a 30% q-control duty cycle and 0 volts indicates a 20% q-control duty cycle. Inside the microprocessor 28, the voltage value can be used to control the timing of the Q-control FETs 64a, 64b. In alternative embodiments, different voltages may represent different q-control duty cycle values.

In one embodiment, the voltage representing the coil current in the wireless power supply is illustrated in FIG. 9B. The abrupt and discrete change in Q-control duty cycle causes ringing in the coil current. The ringing may distort the communication when it is demodulated—causing extra or missing transitions. The demodulation can be performed in a variety of different ways. The thresholds for the demodulation in the current embodiment are shown as 902 and 904. Where the coil current exceeds the 330 mV threshold 902, the communication signal is interpreted as high. When the coil current dips below the 320 mV threshold 904, the communication signal is interpreted as low. The ringing 906 can cause distortion in the communication signal because it can be interpreted as extra transitions or edges outside of demodulation windows. The ringing 901 can also cause bit time distortion. The bit time distortion 901 shows an upward swing in coil current prior to the next transition. This premature transition causes the perceived time of the bit to be shorter for the second '1' and longer for the third '1'. That is, the coil current crosses threshold 904 at bit time 910 sooner than it should—cutting the bit time short. Bit time 912 illustrates where the transition should occur in order for the bit time of the second and third bit to be accurate. To put it another way, the total bit time for bits 914 is about 1 ms, but the apportionment of that bit time between the two bits is not equal—the second 1 bit has a shorter bit time than the third bit time. This type of distortion can cause issues in communication.

The large discrete changes in q-control duty cycle can cause issues in the signal integrity of the communication link, specifically the transmitter demodulation. The overall wireless power system has an under-damped response to a step change in Q-Control duty cycle. This under-damped response can cause an oscillation on the voltage and currents in the transmitter, which the transmitter is monitoring for demodulation. When communication is done using bi-phase encoded data, at a bit rate of 2 kbps (2 kHz and 4 kHz bit width times), the oscillations occur at a frequency of around 5 kHz. This can create in band communication noise and disrupts demodulation by the transmitter.

The voltage representing the incorrect or distorted demodulated communication signal is illustrated in FIG. 9A. The circled areas 908 show how the resultant demodulated communication signal may be affected by the distortion.

Distortion, such as that shown in FIG. 9, can be reduced or eliminated by ramping Q-control duty cycle through smaller steps to signify a data bit. The data bit may include portions where the duty cycle is ramping but also where duty cycle is constant. The exact ratios of the ramping to constant duty cycle time may vary based on implementations. There may be data bits where the duty cycle is always ramping up or down without any constant portions. The transition from ramping up to ramping down may also vary within the bit time. Delaying the transition from ramping up to ramping down can help prevent the zero bit from decaying towards zero.

Figure 7A:
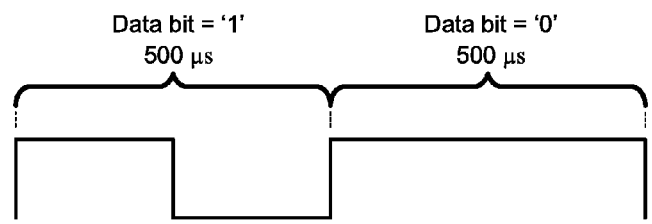
FIGS. 7A-7F show various exemplary graphs of Q-control duty cycle values to generate Q-control communication signals.
Figure 7B:

FIGS. 8A-C illustrates ramping Q-control where instead of jumping between two large discrete values, such as 20% and 30% shown in FIGS. 4 and 7A-B, the Q-control duty cycle can be adjusted to intermediate duty cycle values and ramp to the next duty cycle. This can reduce distortion in the demodulated communication signal. This generally is referred to as ramping Q-control.

The method of ramping Q-control includes receiving power in an adaptive power receiver via inductive coupling with a wireless power supply. The adaptive power receiver can be selectively configured into a first mode in which the adaptive power receiver is capable of storing energy received from the wireless power supply or into a second mode in which the adaptive power receiver releases stored energy to a load. The adaptive power receiver has the ability to either cycle between the first mode and the second mode at a first duty cycle or a second duty cycle to control the amount of power received by the adaptive power receiver. The adaptive power receiver can transition between cycling at the first duty cycle and cycling at the second duty cycle to communicate with the wireless power supply via shifts in impedance that occur at the first and second duty cycles. Transitioning between these two duty cycles may include cycling between the first mode and the second mode at one or more intermediate duty cycles between the first duty cycle and the second duty cycle.

FIG. 8A illustrates a graph of Q-control duty cycle adjustments over two bit times. FIG. 8C shows a graph of ramping Q-control duty cycle values between 20% and 30%. FIG. 8B shows a bi-phase encoded communication signal generated by the wireless power signal illustrated in FIG. 8A using the duty cycle timings of FIG. 8C.

In the depicted embodiment, the Q-control duty cycle is changed by 0.5% after each cycle during a "1" bit and 0.25% after each cycle during a "0" bit. In alternative embodiments, the duty cycle may change by less or more. In other embodiments, the duty cycle may not change after every cycle, but instead after every other cycle, every third cycle, or some other period. The change is constant, depending on the bit, in the FIG. 8 embodiment, however, in other embodiments the amount of the change may be dynamic depending on whether the bit is a zero or a one, the amount of power being transferred, the coupling, or essentially any other factor.

As can perhaps best be seen in FIG. 8A, the Q-control duty cycle begins at 25% and ramps up over about 125 microseconds until it reaches its peak of 30%. After that it ramps down to 30% over the next 250 microseconds. The Q-control duty cycle then ramps back up to 25% over the next 125 microseconds. Because there is no transition in a zero bit, the Q-control duty cycle ramps to 30% over a longer time period, 250 microseconds, than during the first 500 microseconds. From there, the Q-control duty cycle ramps back to 25% over the next 250 microseconds.

Figure 10A:
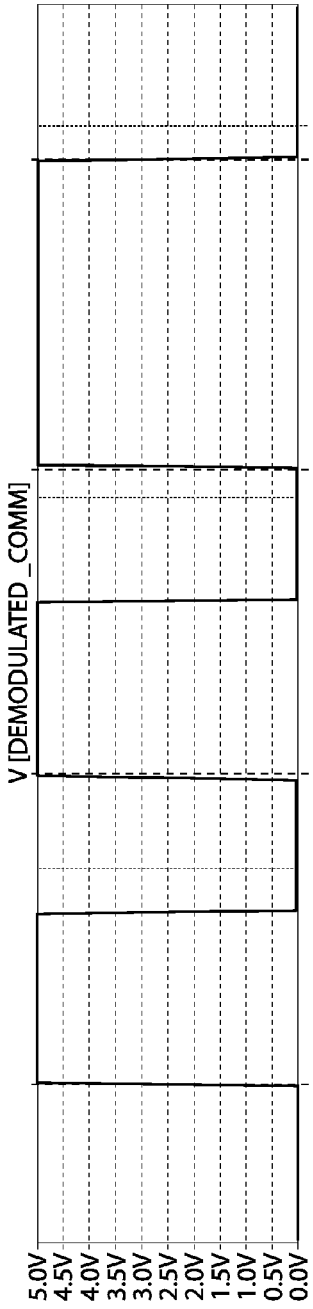
FIG. 10A shows a graph of an improved communication signal generated by ramping Q-control communication.
Figure 10B:
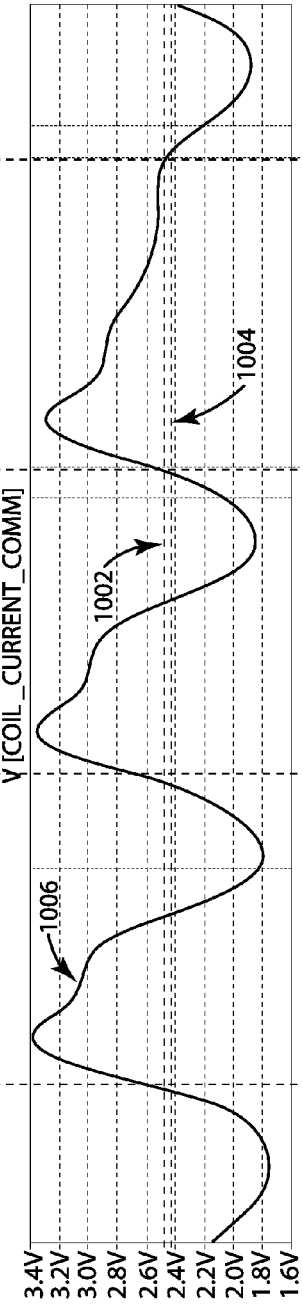
FIG. 10B shows a graph of coil current in the wireless power transmitter during ramping Q-control communication.
Figure 10C:
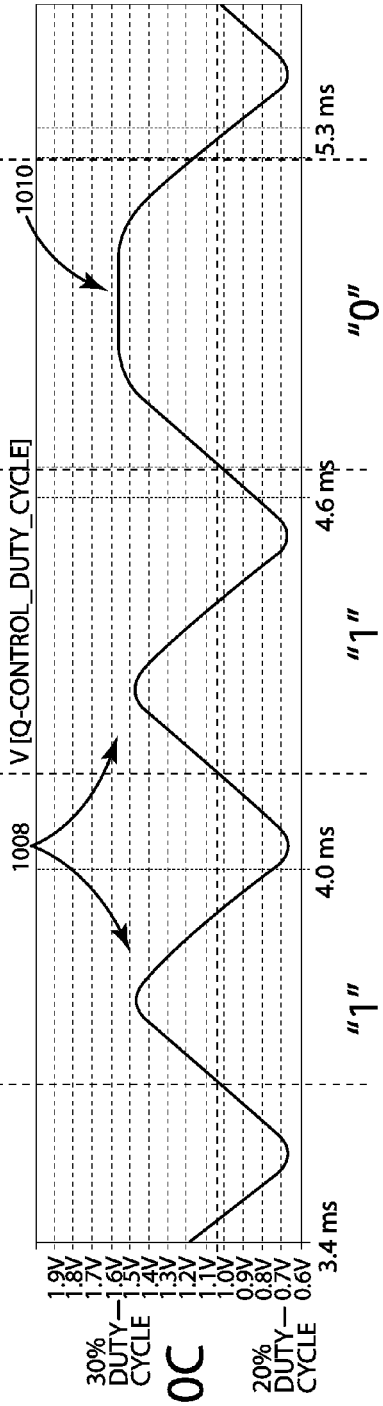
FIG. 10C shows a graph of ramping Q-control duty cycle values used to generate ramping Q-control communication.

FIGS. 10A-C show how using small ramping duty cycle steps for Q-control modulation can decrease ringing in the demodulated information and increase the accuracy of communication. An exemplary Rx communication signal encoded with 3 bits of data is illustrated in FIG. 10C. 1.5 volts indicates a 30% q-control duty cycle and 0.65 volts indicates a 20% q-control duty cycle. The voltages in-between 0.65V and 1.5V represent intermediate duty cycle values where the relative change in voltage corresponds to a relative change in duty cycle. Inside the microprocessor 28, the voltage value can be used to control the timing of the Q-control FETs 64a, 64b. In alternative embodiments, different voltages may represent different q-control duty cycle values.

Referring to FIG. 10C, the Q-control duty cycle can be held at a constant duty cycle or ramp from one duty cycle value to another. During the first two bits 1008, the duty cycle begins at 25% and ramps between 30% and 20%. In the last bit 1010, the duty cycle begins at 25% and ramps to 30% where it is held constant for a period of time and then ramps back to 25%.

In one embodiment, the voltage representing the coil current in the wireless power supply is illustrated in FIG. 10B. The gradual and small steps in Q-control duty cycle reduce the ringing 1006 in the coil current. The demodulation can be performed in a variety of different ways. The thresholds for the demodulation in the current embodiment are shown as 1002 and 1004. Where the coil current exceeds the 2.5V threshold 1002, the communication signal is interpreted as high. When the coil current dips below the 2.4V threshold 1004, the communication signal is interpreted as low. By making small gradual changes to the Q-control duty cycle, the signal integrity of the communication link is increased. The voltage representing the improved demodulated communication signal is illustrated in FIG. 10A.

Figure 11A:
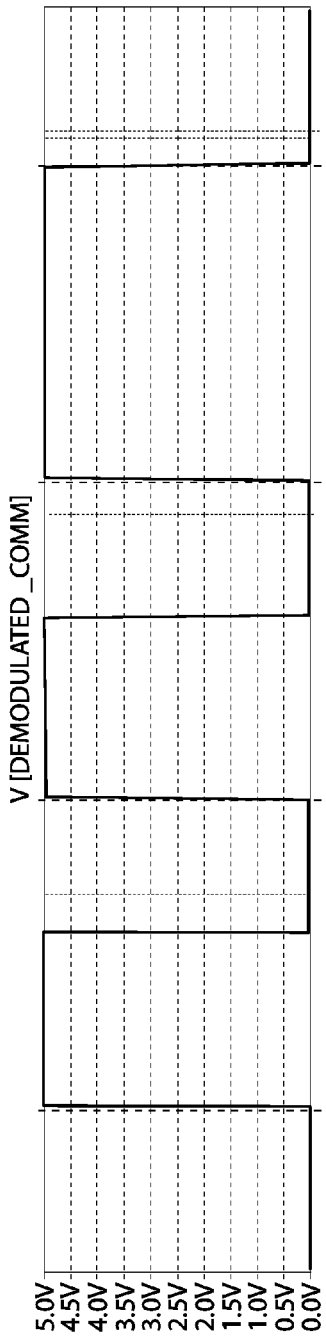
FIG. 11A shows a graph of an improved communication signal generated by ramping Q-control communication.
Figure 11B:
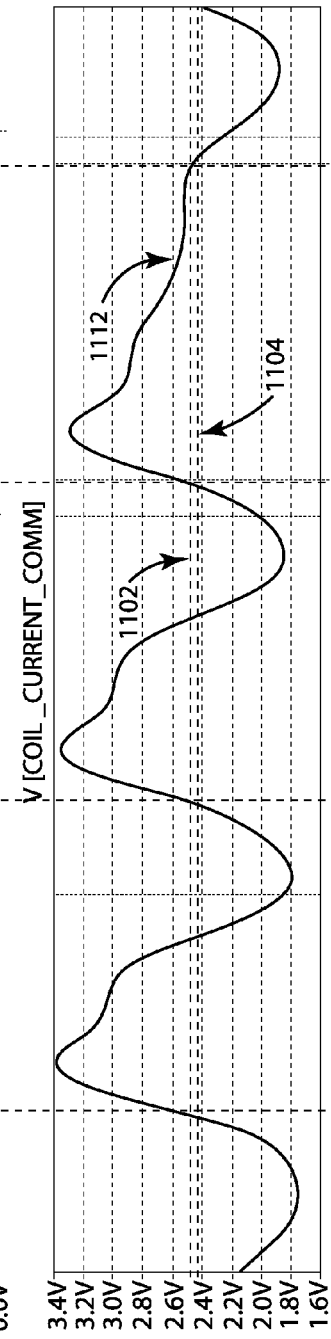
FIG. 11B shows a graph of coil current in the wireless power transmitter during ramping Q-control communication highlighting zero bit decay.
Figure 11C:
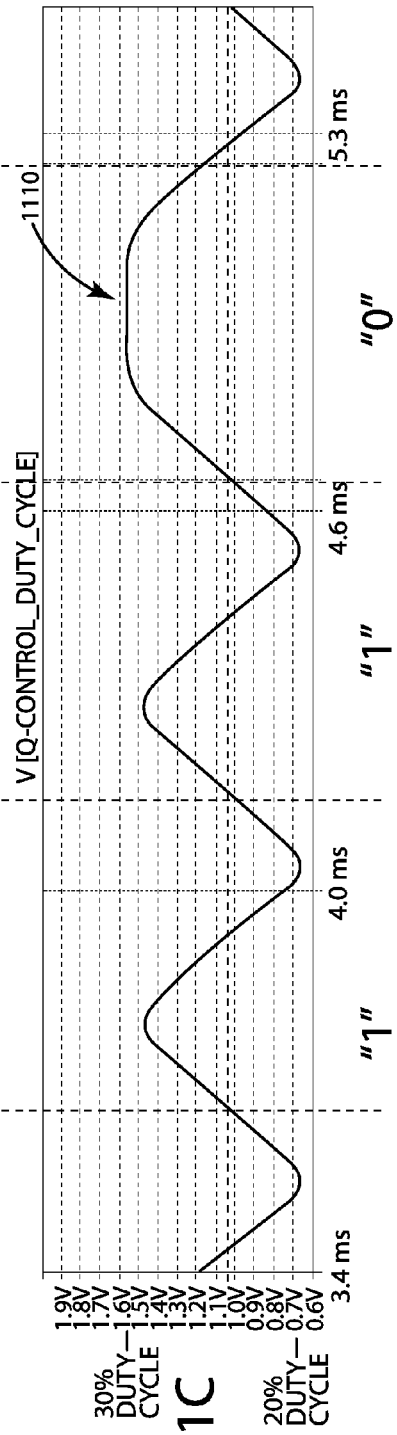
FIG. 11C shows a graph of ramping Q-control duty cycle values used to generate ramping Q-control communication.

One issue that can arise in Q-control communication is that a zero bit in bi-phase encoded data can decay too quickly towards zero when modulating using Q-Control, as shown in FIG. 11. In severe cases, it may cause distortion of the underlying communication signal. The zero bit decay 1112 illustrated in FIG. 11 is not severe enough to affect the communication signal in 11A, but in alternative embodiments and depending on the configuration of the system it may be an issue. FIGS. 11A-C illustrate the same ramping configuration described in connection with FIGS. 10A-C. The coil current representing the zero bit 1110 in FIG. 11B is close to crossing one of the thresholds 1102, 1104. This could generate extra edges during demodulation, which may distort the communication signal or force the communication to be resent.

FIGS. 12A-C illustrate how delaying the peak duty cycle transition can reduce the zero bit decay and improve communication. Delaying the peak duty cycle transition can be done by selectively varying the number and size of the intermediate duty cycle steps. FIG. 12A shows a graph of an improved communication signal generated by ramping Q-control communication with delayed peak duty cycle transition. FIG. 12B shows a graph of coil current in the wireless power transmitter during ramping Q-control communication with delayed peak duty cycle transition. FIG. 12C shows a graph of ramping Q-control duty cycle values with delayed peak duty cycle transition used to generate ramping Q-control communication. The coil current 1212 in the zero bit 1210 does not decay quickly in this configuration, but rather stays at a larger margin above the thresholds 1202, 1204. In alternative embodiments there may be other advantages to positioning the peak (or trough) Q-control duty cycle values within the bit time.

FIG. 8 shows one example of ramping Q-control, where the duty cycle is no held constant, but instead is constantly changing. A variety of embodiments of ramping Q-control are illustrated in FIGS. 7C-7F. FIG. 7A illustrates two bits of bi-phase encoded data for reference and FIG. 7B illustrates Q-control using discrete transitions between 20% and 30% that can create the bi-phase encoded data of FIG. 7A.

Although it will not be discussed in connection with each of the embodiments shown in FIGS. 7B-7F, it should be understood that the adaptive resonance receiver may, but also may not, use Q-Control adjustments for both Power/Voltage control and Communication modulation. Further, the embodiments described below adjust the duty cycle in order to modulate the amplitude of the wireless power carrier signal; however, other modulation techniques may be implemented. Further, the signals depicted are encoded using bi-phase encoding, but other encoding schemes may be used.

FIGS. 7C-7F illustrate a few different exemplary embodiments of ramping Q-control, which can address the distortion and zero bit time delay that can arise from the Q-control illustrated in FIG. 7B.

Figure 7C:
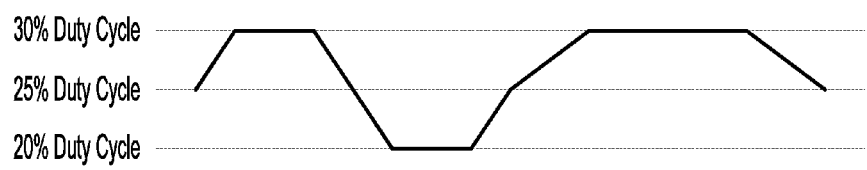

Referring to FIG. 7C, the adjustment for Communication is done using small duty cycle steps that create a ramp. These steps may be linear, quadratic, logarithmic, or any other function to help form the overall shape of the communication signal. The bit times include both times of ramping and times of constant duty cycle. The smaller ramped changes in duty cycle cause a varying reflected impedance from the receiver to the transmitter.

A controller within the Receiver can transmit data back to the Transmitter. The controller may currently be controlling the power/voltage by maintaining the Q-control duty cycle at 25%. To send a bi-phase encoded "one" bit, the controller ramps the Q-control duty cycle up to 30%, leaves it constant for a portion of the bit time and then ramp back down to 25% during a time frame of 250 microseconds. It then ramps down to 20% Q-control duty cycle %, leaves it constant for a portion of the bit time and then ramps back up to 25% during the next 250 microseconds. To send a bi-phase encoded "zero" bit, the controller ramps the Q-control duty cycle up to 30%, leaves it constant for a portion of the bit time and then ramps back down to 25% during the time frame of 500 microseconds. Once the data is transmitted, the controller can continue to control power/voltage by maintaining the Q-control duty cycle at 25% or whatever new value is appropriate given changes in the system (load/coupling changes).

Figure 7D:
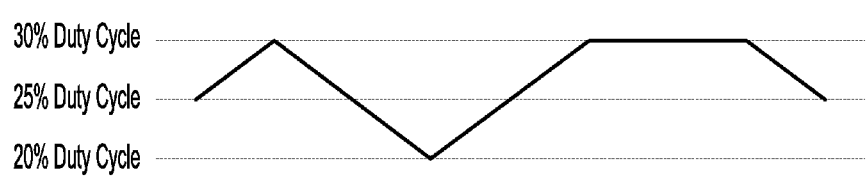

Referring to FIG. 7D, adjustment for Communication is also done using small duty cycle steps that create a ramp. These steps may be linear, quadratic, logarithmic, or any other function to help form the overall shape of the communication signal. The bits may include both times of always ramping and/or times of ramping and constant duty cycle. The smaller ramped changes in duty cycle cause a varying reflected impedance from the Receiver to the Transmitter.

A controller within the receiver can transmit data back to the transmitter. The controller may currently be controlling the power/voltage by maintaining the Q-control duty cycle at 25%. To send a bi-phase encoded "one" bit, the controller ramps the Q-control duty cycle up to 30%, and then ramps back down to 25% during a time frame of 250 microseconds. It then ramps down to 20% Q-control duty cycle and then ramps back up to 25% during the next 250 microseconds. To send a bi-phase encoded "zero" bit, the controller ramps the Q-control duty cycle up to 30%, leaves it constant for a portion of the bit time and then ramps back down to 25% during the time frame of 500 microseconds. Once the data is transmitted, the control can continue to control power/voltage by maintaining the Q-control duty cycle at 25% or whatever new value is appropriate given changes in the system (load/coupling changes).

Figure 7E:
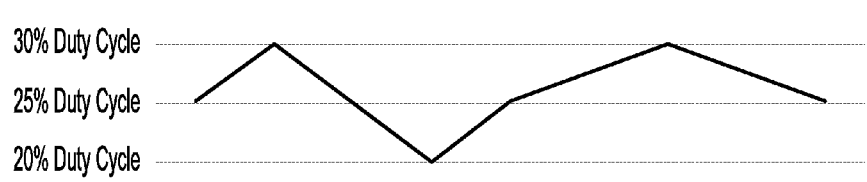
Figure 7F:

Referring to FIGS. 7E and 7F, another two embodiments of Q-control for communication is done using small duty cycle steps that create a ramp. In this embodiment, the q-control is always ramping duty cycle. The duty cycle steps may be linear, quadratic, logarithmic, or any other function to help form the overall shape of the communication signal. The peak duty cycle can be positioned at the center of the bit time (See FIG. 7E), delayed towards the end of the bit time (See FIG. 7F), or positioned elsewhere within the bit time. The smaller ramped changes in duty cycle cause a varying reflected impedance from the Receiver to the Transmitter.

A controller within the Receiver can transmit data back to the Transmitter. In the depicted embodiment, the controller is controlling the power/voltage by maintaining the Q-control duty cycle at 25%. To send a bi-phase encoded "one" bit, the controller ramps the Q-control duty cycle up to 30% and then ramps back down to 25% during a time frame of 250 microseconds. It then ramps down to 20% Q-control duty cycle and then ramps back up to 25% during the next 250 microseconds. To send a bi-phase encoded "zero" bit, the controller ramps the Q-control duty cycle up to 30% and then ramps back down to 25% during the time frame of 500 microseconds. Once the data is transmitted, the control continues to control power/voltage by maintaining the Q-control duty cycle at 25% or whatever new value is appropriate given changes in the system (load/coupling changes). For either a one or a zero, the transition point where duty cycle stops ramping up (or down) and instead ramps down (or up) can be either centered in the bit time, delayed towards the end of the bit time, or positioned elsewhere in the bit time.

A communication link between a receiver and a transmitter can provide information such as operating points and limits, battery charge level, safety, and device identification to a Transmitter. Alternatively, the communication link may be unrelated to operation of the remote device or wireless power transmitter, for example music or other data. This link can provide feedback on a regular interval during wireless power transfer. This link can include an amplitude modulated signal. This amplitude modulation can be generated within the receiver by causing an impedance shift on the power signal which is reflected back to the transmitter. The transmitter can monitor primary coil current and/or additional signals to detect this modulation and determine what information is being received. As discussed above, the impedance shift can be created by changing the duty cycle of the q-control FET or FETs.

In operation, the Q-control FETs 64a-b can be driven for power/voltage control and/or for communication modulation. The transmitter can detect the communication independent of the amount of power being transmitted. In other words, the modulations of the backscatter signal may be generated and detected independent of whether there is a large or small amount of power being transmitted. For example, the relative size of the modulations may be proportional to the amplitude of the carrier signal—in this case, the power transfer signal.

As noted above, adaptive resonance control of the adaptive power receiver can be performed independently by the receiver, without input from a wireless power supply. Alternatively, adaptive resonance control of the adaptive power receiver can be performed based on input from a wireless power supply or according to instructions from the wireless power supply. Instructions can be communicated to the remote device via a variety of different communication methods. For example, communication methods for communicating to the remote device may include frequency shift keying, amplitude modulation, or other external radio frequency links like Bluetooth, WiFI, RFID, etc. In one embodiment, Q Control may be utilized to implement amplitude modulation communicate to the receiver.

Adaptive resonance control of the adaptive power receiver can be performed as the sole form of power control in a wireless power supply system, as one form of power control among other types of power control in the overall system, or not performed for power control at all—just for q-control communication. For example, in some embodiments, the wireless power supply outputs a fixed amount of power and each remote device that is present can use adaptive resonance control to control how much power it receives. In another embodiment, the wireless power supply communicates with any remote devices that are present and provides instructions to the remote devices about how to execute the adaptive resonance control. The wireless power supply may collect information from the remote devices in order to determine the adaptive resonance control settings for each of the devices, and instruct each of the remote devices accordingly. The instructions may be based on the total amount of power being supplied by the inductive power supply, the individual remote device power needs, or a combination of the two. In alternative embodiments, the instructions may be based on additional or different factors. In further embodiments, the remote devices may have a separate power control system (or no explicit power control system) and use Q-control to communicate with the wireless power supply.

In some embodiments, there are additional types of power control included in the wireless power system. For example, the wireless power system may adapt the amount of power being transmitted based on the needs of the remote devices. This can be done in a variety of different ways, such as adjusting the operating frequency of the inductive power supply, adjusting the resonant frequency of the inductive power supply, adjusting the duty cycle of the inductive power supply, or adjusting any other inductive power supply setting either alone or in combination.

Using the adaptive resonance control, the wireless power transfer system can allow power to be controlled at multiple points. For example, the system may utilize receiver only control where the receiver is responsible for using adaptive resonance control (in addition to or instead of other ways of power control such as resonant frequency control) to ensure that the appropriate power is being received. The system may additionally utilize transmitter control to adjust the amount of power available to the receiver or receivers. This system may or may not use communication to control the adjustment of power. For example, a receiver may be placed on a transmitter that transmits energy regardless of the detected load, in which case the receiver can adjust the adaptive resonance control to ensure it receives the correct amount of power. Alternatively, the transmitter may measure the impedance reflected back to the transmitter and adjust the amount of power transmitted based on the reflected impedance. The system may additionally combine all of these so that each device is receiving the power it desires regardless of the differences in power desires of multiple devices that may be placed on the transmitter.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A remote device for receiving wireless power from a wireless power supply, said remote device comprising:
   an adaptive power receiver capable of receiving power from the wireless power supply through inductive coupling, said adaptive power receiver configurable to a first mode and configurable to a second mode;
   a load for receiving electrical power generated in said adaptive power receiver, wherein in said first mode, said adaptive power receiver is capable of storing energy received from the wireless power supply, wherein said second mode, said adaptive power receiver releases said stored energy to said load; and
   a controller operably coupled to the adaptive power receiver, said controller configured to communicate information to the wireless power supply by switching between said first mode and said second mode.

2. The remote device of claim 1 wherein said controller is capable of controlling power received from the wireless power supply by selectively configuring the adaptive power receiver between said first mode and said second mode.

3. The remote device of claim 1 wherein the each bit of the information communicated to the wireless power supply is represented by a plurality of transitions between the first mode and the second mode.

4. The remote device of claim 3 wherein said controller controls a duty cycle of said first mode with respect to said second mode over a bit time, wherein increasing said duty cycle increases a duration of time over which said adaptive power receiver is in said first mode, and wherein decreasing said duty cycle decreases said duration of time over which said adaptive power receiver is in said first mode; and
   wherein said controller is capable of communicating to the wireless power supply by selectively adjusting said duty cycle between two values to shift impedance of the remote device, wherein adjusting said duty cycle between two values includes adjusting said duty cycle between one or more intermediate duty cycle values.

5. The remote device as claimed in claim 4 wherein number and size of said one or more intermediate duty cycle steps are selected to reduce ringing in said communication.

6. The remote device as claimed in claim 4 wherein number and size of said one or more intermediate duty cycle steps are selected to reduce zero bit decay.

7. The remote device as claimed in claim 4 wherein number and size of said one or more intermediate duty cycle steps are selected to produce a constant duty cycle during a portion of said bit time.

8. The remote device as claimed in claim 4 wherein number and size of said one or more intermediate duty cycle steps are selected to produce a varying duty cycle during the entire bit time.

9. The remote device as claimed in claim 1 wherein said first mode is a high-Q mode and said second mode is a low-Q mode.

10. The remote device as claimed in claim 9 wherein said controller controls the duration at which said adaptive power receiver is in said high-Q mode in order to maintain the effective Q of the adaptive power receiver above or below a threshold, thereby improving efficiency of power transfer between the wireless power supply and said remote device.

11. The remote device as claimed in claim 1 wherein said adaptive power receiver includes adaptive control circuitry capable of both rectifying received power and switching the adaptive power receiver between said first mode and said second mode.

12. The remote device as claimed in claim 1 wherein said first mode is resonant and said second mode is highly resonant.

13. The remote device as claimed in claim 1 further comprising a supplemental receiver capable of receiving power from the wireless power supply through inductive coupling, wherein in said first mode, said adaptive power receiver provides power to said supplemental receiver from said wireless power supply and bypasses providing power directly to said load, and wherein in said second mode, said adaptive power receiver provides power directly to said load.

14. The remote device as claimed in claim 1 wherein said adaptive power receiver has reduced equivalent series resistance in said first mode compared to said second mode.

15. The remote device as claimed in claim 1 wherein said controller controls said adaptive power receiver to increase an amount of power received in response to determining that power received is below a threshold.

16. The remote device as claimed in claim 1 wherein said adaptive power receiver includes a single inductor capable of inductively coupling with the wireless power supply.

17. A method for controlling power received from a wireless power supply in a remote device, said method comprising:
receiving power in an adaptive power receiver via inductive coupling with the wireless power supply;
selectively configuring the adaptive power receiver in a first mode in which the adaptive power receiver is capable of storing energy received from the wireless power supply;
selectively configuring the adaptive power receiver in a second mode in which the adaptive power receiver releases stored energy to a load;
switching between the first mode and the second mode to communicate information to the wireless power supply.

18. The method of claim 17 comprising switching between the first mode and the second mode a plurality of times for each bit of the information communicated to the wireless power supply.

19. The method of claim 17 comprising:
cycling between the first mode and the second mode at a first duty cycle to control the amount of power received by the adaptive power receiver;
cycling between the first mode and the second mode at a second duty cycle to control the amount of power received by the adaptive power receiver; and
wherein said transitioning includes transitioning between cycling between the first mode and the second mode at the first duty cycle and cycling between the first mode and the second mode at a second duty cycle to communicate the information to the wireless power supply, wherein said transitioning includes cycling between the first mode and the second mode at one or more intermediate duty cycles, said intermediate duty cycles being between said first duty cycle and said second duty cycle.

20. The method of claim 19 wherein number and size of said one or more intermediate duty cycle steps are selected to reduce ringing in said communication.

21. The method of claim 19 wherein number and size of said one or more intermediate duty cycle steps are selected to reduce zero bit decay.

22. The method of claim 17 wherein the first mode is a high-Q mode and the second mode is a low-Q mode.

23. The method of claim 22 including controlling the duration at which said adaptive power receiver is in said high-Q mode in order to maintain the effective Q of the adaptive power receiver above or below a threshold, thereby improving efficiency of power transfer between the wireless power supply and said remote device.

24. A wireless power system for transmitting wireless power from a wireless power supply to a remote device and communicating from the remote device to the wireless power supply, said wireless power system comprising:
a remote device including,
an adaptive power receiver capable of receiving power from the wireless power supply through inductive coupling, said adaptive power receiver configurable to a first mode and configurable to a second mode;
a load for receiving electrical power generated in said adaptive power receiver, wherein in said first mode, said adaptive power receiver is capable of storing energy received from the wireless power supply, wherein said second mode, said adaptive power receiver releases said stored energy to said load; and
a controller operably coupled to the adaptive power receiver, said controller configured to communicate information to the wireless power supply by switching between said first mode and said second mode; and
a wireless power transmitter including,
an adaptive power transmitter capable of transmitting wireless power to the remote device, said adaptive power transmitter configurable to a first resonant mode and configurable to a second resonant mode;
wherein in said first resonant mode, said adaptive power transmitter has a first resonant frequency, wherein in said second resonant mode, said adaptive power transmitter has a second, different, resonant frequency; and
a controller operably coupled to the adaptive power receiver, said controller capable of controlling power transmitted by the wireless power supply by selectively configuring the adaptive power transmitter between said first resonant mode and said second resonant mode.

25. The wireless power system as claimed in claim 24 wherein said controller of said remote device is capable of controlling power received from the wireless power supply by selectively configuring the adaptive power receiver between said first mode and said second mode.

26. The wireless power system of claim 24 wherein said controller controls a duty cycle of said first mode with respect to said second mode over a bit time, wherein increasing said duty cycle increases a duration of time over which said adaptive power receiver is in said first mode, and wherein decreasing said duty cycle decreases said duration of time over which said adaptive power receiver is in said first mode; and
wherein said controller is capable of communicating to the wireless power supply by selectively adjusting said duty cycle between two values to shift impedance of the remote device, wherein adjusting said duty cycle between two values includes adjusting said duty cycle between one or more intermediate duty cycle values.

27. The wireless power system as claimed in claim 26 wherein said controller of said remote device is configured to reduce ringing in said communication by selectively adjusting said duty cycle between two values to shift impedance of the remote device, wherein adjusting said duty cycle between two values includes adjusting said duty cycle between one or more intermediate duty cycle values and wherein said duty cycle is held constant for at least a portion of the bit time.

28. The wireless power system as claimed in claim 26 wherein said controller of said remote device is configured to reduce ringing in said communication by selectively adjusting said duty cycle between two values to shift impedance of the remote device, wherein adjusting said duty cycle between two values includes adjusting said duty cycle between one or more intermediate duty cycle values and wherein said duty cycle is varies over substantially all of the bit time.

29. The wireless power system as claimed in claim 26 configured to begin and end said bit time at a duty cycle substantially half-way between said two values.

30. The wireless power system as claimed in claim 26 wherein number and size of said one or more intermediate duty cycle steps are selected to reduce zero bit decay.

* * * * *